Feb. 26, 1957 C. M. EUBANK 2,782,525
EARTH MOVING MACHINE LEVEL INDICATOR
Filed April 12, 1956 2 Sheets-Sheet 2
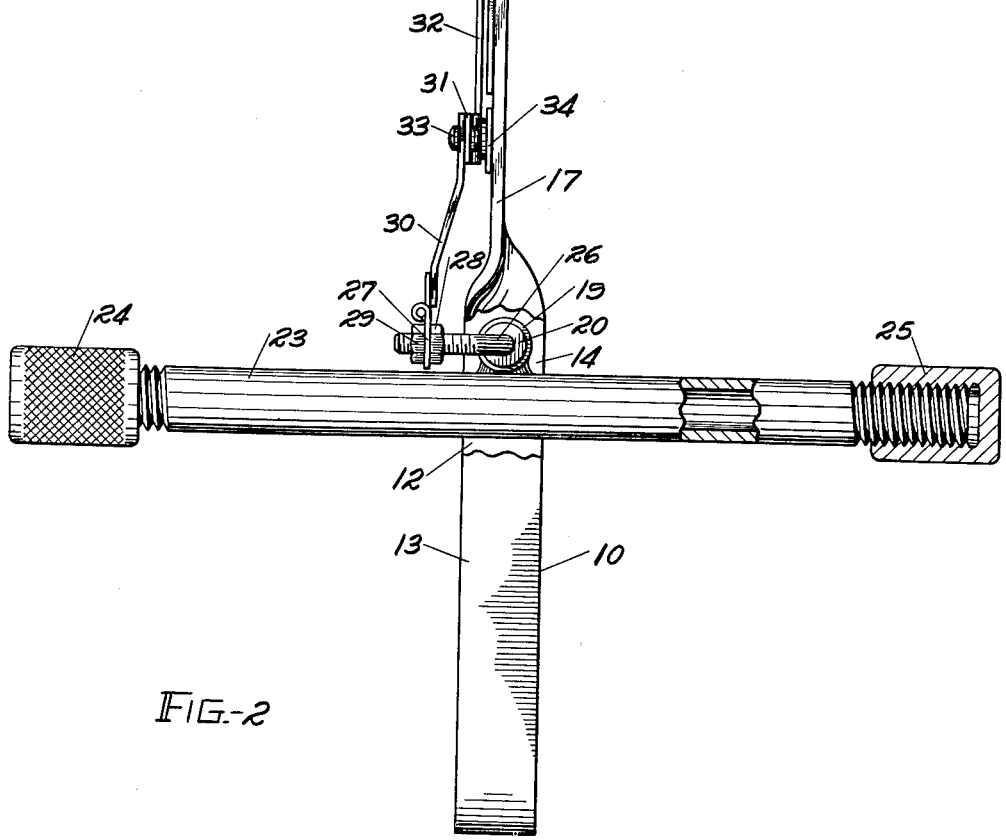
INVENTOR~
CHESTER M. EUBANK
BY~ Herbert A. Minturn
ATTORNEY

United States Patent Office 2,782,525
Patented Feb. 26, 1957

2,782,525

EARTH MOVING MACHINE LEVEL INDICATOR

Chester M. Eubank, Paoli, Ind.

Application April 12, 1956, Serial No. 577,737

2 Claims. (Cl. 33—215)

This invention relates to a device for indicating angularity of ground when an earth moving machine is operating to define constant contour lines around a hillside or slope and the like. In other words the device is intended to indicate the angularity of the ground longitudinally of the machine such as a bulldozer or a tractor operating a breaking plow or even a grader and the like.

It is a primary object of the invention to make an exceedingly simple and yet rugged device for the purpose intended and which will be sufficiently accurate for contour work particularly as may be involved in plowing ground around a hillside, for plowing panels with their boundary lines at constant contour elevation lines.

It is a further important object of the invention to be able to set the device to indicate the desired angle required to maintain the contour, that is the angle of the earth moving machine itself, by adjusting the device to read "zero" for a given angle so that the operator will not be confused in trying to remember a certain angle but will always know that he is on the required slope by noting the zero position on the indicator.

These and many other objects and advantages of the invention including the unique combination of the various elements permitting quick adjustment for level or angle indications, and also including the ease of mounting the device on the machine, will become apparent to those versed in the art in the following description of one particular form of the device as illustrated in the accompanying drawings, in which Fig. 1 is a view in elevation of a structure embodying the invention;

Fig. 2 is a view in end elevation in partial section;

Fig. 3 is a view in horizontal section on the line 3—3 in Fig. 1; and

Fig. 4 is a view in transverse section on the line 4—4 in Fig. 1.

Figure 1:
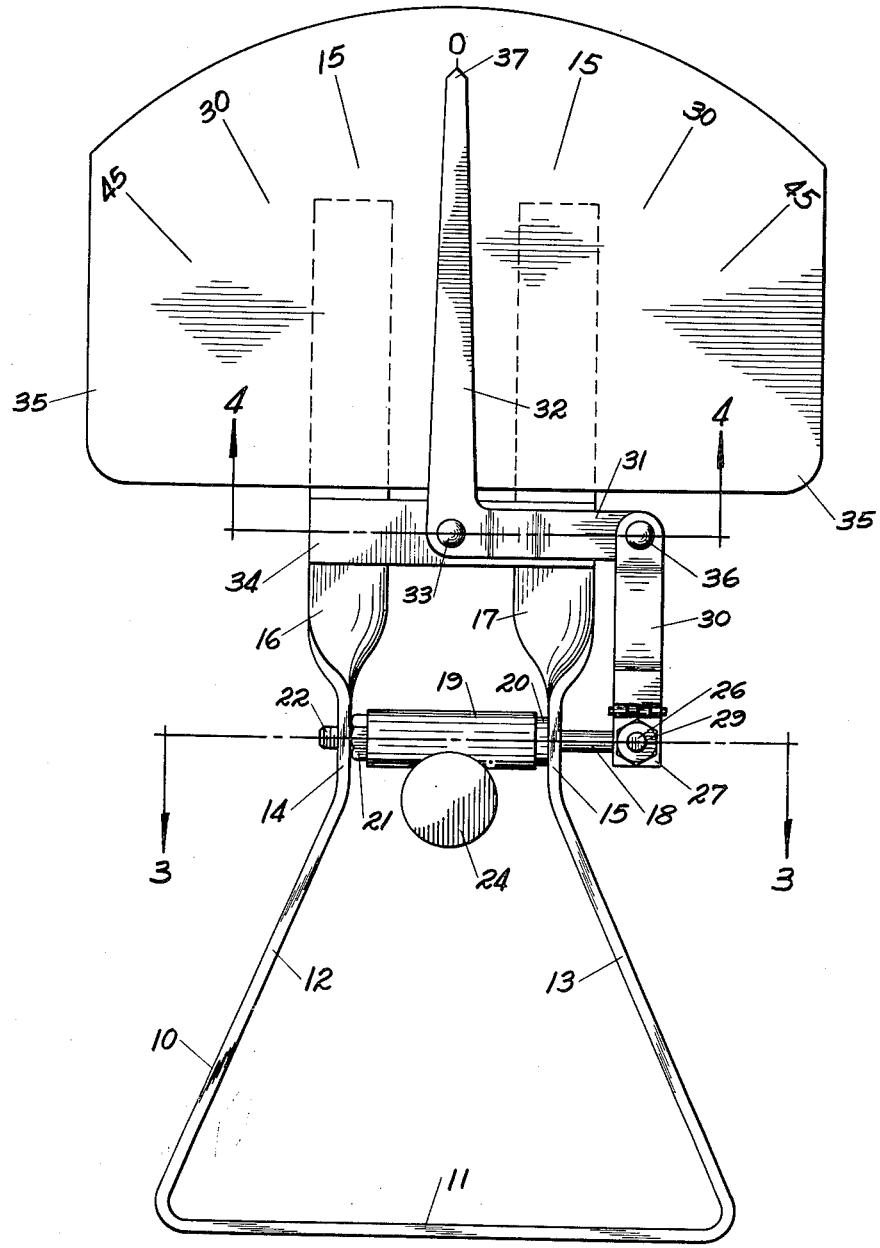

A frame generally designated by the numeral 10 is formed to have a lower horizontal bar 11 from the ends of which are upturned side legs 12 and 13 preferably sloping one towards the other in a symmetrical fashion in relation to a vertical center line from the cross bar 11.

The legs 12 and 13 each respectively are formed to have a vertical portion 14 and 15 to be parallel one with the other, from the upper ends of which sections 14 and 15 lay legs 12 and 13 which are twisted to have upwardly extending arms 16 and 17 in a common vertically disposed plane.

A rock shaft 18 is rockably extended through the flat portions 14 and 15 to have its axis substantially parallel with the bar 11. This shaft 18 carries a sleeve 19 between the portions 14 and 15, preferably separated at one end by a spacer washer 20 and on the other end by a nut 21 screw-threadedly engaging an outer end 22 of the shaft 18. The shaft 18 is passed through the flat portion 15, the washer 20, the sleeve 19, and screw-threadedly engages the nut 21 to have the end portion 22 eventually come through the flat portion 14 all as indicated in Fig. 1 as well as in Fig. 3.

A bar 23 which may be either solid or as herein shown tubular is fixed centrally to the underside of the sleeve 19 as best indicated in Fig. 2. That is, the entire portion of the bar 23 lies below the underside of the sleeve 19. The attachment of the bar 23 to the sleeve 19 is made to be centrally of the length of the bar 23 as near as possible. A weight member is screw-threadedly attached to each of the ends of the bar 23, this member in the present illustration consisting of a cap nut 24 and 25 respectively.

The shaft 18 has a crank arm 26 extending normally therefrom at one end portion, and a small plate 27 is secured to the outer end of this crank arm 26 by any suitable means, herein shown as being secured between two nuts 28 and 29 screw-threadedly engaging the outer end portion of the arm 26.

A connecting bar 30 is hinged to the top end of the plate 27 and extends upwardly to be rockably engaged to a more or less horizontally presented arm 31 of a sweep bar 32. The members 31 and 32 are preferably integral, and are pivoted at the intersecting angle therebetween by any suitable means such as by a rivet 33 to a cross bar 34 secured to the two upturned arms 16 and 17.

Above the cross bar 34 there is a dial plate 35 fixed to the arms 16 and 17 in a permanent manner. The bar 30 is interconnected to the member 31 at its outer end in any suitable manner, herein shown as by a rivet 36 giving sufficient freedom of rocking to permit the rocking of the shaft 18 through the bar 30 to rock the sweep bar 32 across the face of the dial 35.

The device described is mounted on the vehicle or machine (not shown) by any suitable attaching means engaging the transverse bar 11. With the machine in a level position, the bar 23 is adjusted in effective lengths by the end nuts 24 and 25 either retracted or advanced along the ends of the bar 23 as may be required to bring the upper end 37 of the sweep bar 32 to a zero position as indicated in Fig. 1. That is to say, the nuts 24 and 25 are employed as variably positioned balance weights to effect the positioning of the pointer end 37 of the sweep bar 32. This position of course may be changed depending upon the angularity of the work to be performed.

While I have herein shown and described my invention in the one particular form in more or less minute detail, it is obvious that structural variations may be employed without departing from the spirit of the invention, and I therefore do not desire to be limited to that precise form beyond the limitations which may be imposed by the following claims.

I claim:

1. In an earth moving machine level indicator, a U-shaped frame having a pair of upwardly extending, spaced apart legs and a lower interconnecting member; a cross bar fixed across an uppper portion of said legs; a dial plate also fixed across an upper portion of said legs; a shaft rockably carried by and across said legs below said bar; a crank arm extending normally from one end of said shaft; a weight bar fixedly carried immediately across the underside of and normal to said shaft; a weight adjustably attached and positioned on each end of said weight bar; a sweep bar pivotally engaging said cross bar; a lever arm extending normally from said sweep bar; and means interengaging said lever arm and said crank arm rocking the sweep bar across the said dial plate upon rotation of the shaft.

2. The structure of claim 1 in which said interengaging means consists of a plate secured to the outer end of said crank arm; and a vertically disposed connecting bar hingedly engaging said plate by one end and rockably engaging said lever arm by its other end.

References Cited in the file of this patent

UNITED STATES PATENTS

| 17,870 | Cole | July 28, 1857 |
| 1,319,249 | Rummer | Oct. 21, 1919 |